(12) United States Patent
Rebeor et al.

(10) Patent No.: US 8,901,959 B2
(45) Date of Patent: Dec. 2, 2014

(54) HYBRID IO CELL FOR WIREBOND AND C4 APPLICATIONS

(75) Inventors: Chris J. Rebeor, Cambridge, VT (US); Rohit Shetty, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 13/415,946

(22) Filed: Mar. 9, 2012

(65) Prior Publication Data

US 2013/0234756 A1 Sep. 12, 2013

(51) Int. Cl.
*H03K 19/177* (2006.01)

(52) U.S. Cl.
USPC ............... 326/41; 326/37; 716/122; 716/135; 257/782; 257/E23.02

(58) Field of Classification Search
USPC .............. 257/750, 758, 782, E23.02, E23.06, 257/E23.023, E21.59, 737, 773; 326/37–47; 716/128, 130, 118–121
See application file for complete search history.

(56) References Cited

U.S. PATENT DOCUMENTS

| | | | |
|---|---|---|---|
| 6,242,814 B1 | 6/2001 | Bassett | |
| 6,446,250 B1 | 9/2002 | Becker | |
| 6,457,157 B1 * | 9/2002 | Singh et al. | ................... 716/122 |
| 6,727,597 B2 | 4/2004 | Taylor et al. | |
| 6,836,026 B1 | 12/2004 | Ali et al. | |
| 6,870,273 B2 | 3/2005 | Tao et al. | |
| 7,146,596 B2 | 12/2006 | Bednar et al. | |
| 7,165,232 B2 | 1/2007 | Chen et al. | |
| 7,194,707 B2 | 3/2007 | Chung-Maloney et al. | |
| 7,266,789 B2 | 9/2007 | Chung-Maloney et al. | |
| 7,808,117 B2 | 10/2010 | Vo et al. | |
| 2007/0267748 A1 * | 11/2007 | Tran et al. | ..................... 257/750 |
| 2010/0237509 A1 | 9/2010 | Wu et al. | |
| 2010/0276816 A1 * | 11/2010 | Ali et al. | ........................ 257/782 |
| 2011/0260318 A1 * | 10/2011 | Eisenstadt | ..................... 257/737 |
| 2012/0025401 A1 | 2/2012 | Lee et al. | |

OTHER PUBLICATIONS

"Aragio: Our IP Will Work in Your Design Flow", http://www.aragio.com/, 2006, 1 page.
"ARM: The Architecture for the Digital World", http://www.arm.com/products/physical-ip/interface-ip/general-purpose-io.php, Mar. 8, 2012, pp. 1-4.

* cited by examiner

*Primary Examiner* — Thienvu Tran
*Assistant Examiner* — Christopher Lo
(74) *Attorney, Agent, or Firm* — David Cain; Roberts Mlotkowski Safran & Cole, P.C.

(57) ABSTRACT

A hybrid IO cell for use with controlled collapse chip connection, wirebond core limited, wirebond IO limited, and wirebond inline chip designs is provided. A method of designing the hybrid IO cell includes designating a technology, determining a minimum pad width of the technology, and determining a minimum pad spacing of the technology. The method also includes determining a width of the hybrid IO cell based on the minimum pad width and the minimum pad spacing, setting a length of the hybrid IO cell equal to the determined width, and storing a definition of the IO cell in a library stored on a computer useable storage medium.

14 Claims, 6 Drawing Sheets

US 8,901,959 B2

HYBRID IO CELL FOR WIREBOND AND C4 APPLICATIONS

FIELD OF THE INVENTION

The invention relates to integrated circuit design and, more particularly, to a hybrid IO cell for wirebond and C4 applications.

BACKGROUND

In current integrated circuit (IC) design systems and processes, IO (input/output) cell design is dictated by the type of package in which the IO cell will be used. There are two main package types, wirebond (WB) and controlled collapse chip connection (C4, also referred to as flip-chip). Each package type, wirebond and C4, has different requirements on the IO cell design and thus conventionally require at least two separate libraries for IC design.

In addition to having different requirements from C4, wirebond is further complicated by the fact that there are at least three unique design techniques that place particular requirements on the IO cell, i.e., core limited, IO limited, and inline. In practice, unique IO cells are designed for each respective design technique. For example, in IO limited designs, the IO cells are tall and narrow rectangles having a length greater than a width (the width being the edge of the IO cell that is parallel to the nearest edge of the die). On the other hand, in core limited designs, the IO cells are short and wide rectangles having a width greater than a length.

As a result, an IO cell that is defined for one of the design techniques (e.g., core limited) is not used with another design technique (e.g., IO limited). Similarly, an IO cell that is defined for any one of the wirebond techniques in not used with a C4 package, and vice versa. Designing different IO cells for the different die and package architectures (e.g., C4, core limited, IO limited, and inline) takes time and resources, and thus introduces inefficiency to the application specific integrated circuit (ASIC) and/or Foundry design process.

Accordingly, there exists a need in the art to overcome the deficiencies and limitations described hereinabove.

SUMMARY

In an aspect of the invention, there is a method of designing an IO (input-output) cell. The method includes determining a width of the IO cell based on a minimum pad width and a minimum pad spacing for a technology. The method also includes determining a length of the IO cell based on the determined width. The method also includes storing a definition of the IO cell including the determined width and length in a library stored on a computer useable storage medium.

In an aspect of the invention, there is a method of designing a hybrid IO cell for use with controlled collapse chip connection, wirebond core limited, wirebond IO limited, and wirebond inline chip designs. The method includes designating a technology, determining a minimum pad width of the technology, and determining a minimum pad spacing of the technology. The method also includes determining a width of the hybrid IO cell based on the minimum pad width and the minimum pad spacing. The method also includes setting a length of the hybrid IO cell equal to the determined width. The method also includes storing a definition of the IO cell in a library stored on a computer useable storage medium.

In an aspect of the invention, there is an integrated circuit chip including a hybrid IO cell having a width that is based on a minimum pad width and a minimum pad spacing for a technology. A length of the hybrid IO cell is equal to the width In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of a hybrid IO cell, which comprises the structures of the present invention. In still further embodiments, a method in a computer-aided design system is provided for generating a functional design model of the hybrid IO cell. The method comprises generating a functional representation of the structural elements of the hybrid IO cell.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to integrated circuit design and, more particularly, to a hybrid IO cell for wirebond and C4 applications. In accordance with aspects of the invention, there is a single IO cell, referred to as a hybrid IO cell, which is usable with any of the conventional design applications, e.g., C4, core limited, IO limited, and inline. In embodiments, the hybrid IO cell is square and has a length and width that are based on the wirebond pad pitch for a given technology. The symmetry provided by a square shape permits a designer to use any edge of the hybrid IO cell along any edge of the chip. Moreover, the hybrid IO cell does not contain a C4 pad or wirebond pad. As a result, the designer connects the hybrid IO cell to a desired pad and power grid for the particular application, which gives the designer a wide range of freedom for placement of the hybrid IO cell and eliminates restrictions on the area and size of the hybrid IO cell. As a result of its square shape and being devoid of a pad, the hybrid IO cell can be placed anywhere and in any configuration on the chip. In this manner, implementations of the invention advantageously provide a hybrid IO cell that can be used equally with all of C4, core limited, IO limited, and inline designs.

According to aspects of the invention, there is a method to design a hybrid IO cell form factor such that it can be efficiently used in a wirebond (e.g., inline, staggered, etc.) or a C4 (e.g., area, peripheral, etc.) package. In embodiments, the hybrid IO cell form factor is optimized such that the cell height is the same as the cell width. For example, in embodiments, a method includes adjusting the hybrid IO cell width such that it is a multiple of a wirebond pad width plus a predefined cell-to-cell spacing, and adjusting the hybrid IO cell length to be equal to the width. This allows placement of the hybrid IO cell along the top/bottom edges and the left/right edges of the die (e.g., chip) without rotation of the hybrid IO cell. Therefore, all devices are aligned in the same orientation as required in some new technology nodes (e.g., 32 nm, etc.). Implementations of the invention advantageously provide IP developers (e.g., IC designers) a single IO layout for both C4 and wirebond packages and for both left/right and top/bottom chip placement. Implementations of the invention also advantageously provide the ability to run a testchip using a wirebond package and use the exact same IO design in production using a C4 package, and vice versa.

Figure 1:
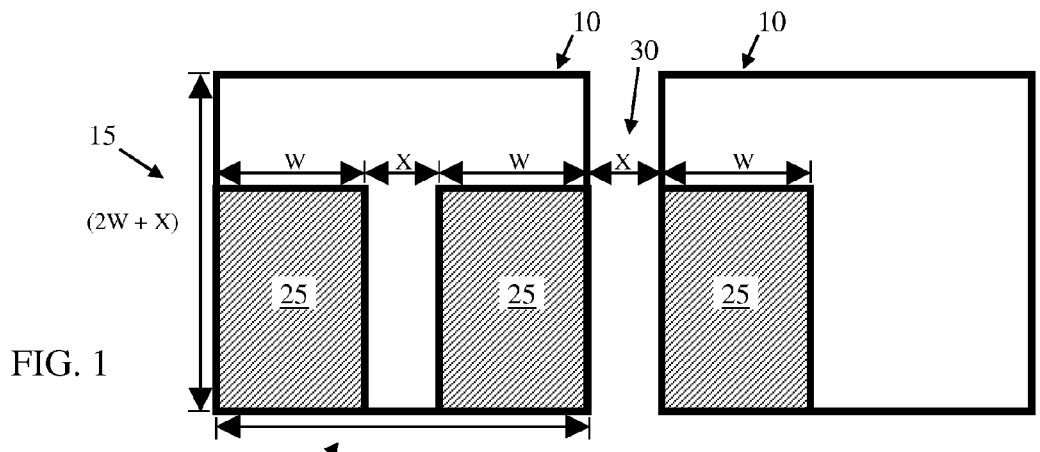
FIGS. 1-3 show hybrid IO cells in accordance with aspects of the invention.

FIG. 1 shows two hybrid IO cells 10 and, in particular, shows the spatial relationship of the dimensions of the hybrid IO cells 10 to the pad pitch in accordance with aspects of the invention. In embodiments, each hybrid IO cell 10 is square, i.e., the length dimension 15 is substantially the same as the width dimension 20 in plan view (e.g., top down view). In implementations, the length 15 and width 20 are given by Equation 1:

$$\text{Length}=\text{Width}=2W+X \qquad (1)$$

In Equation 1, "W" is the minimum width of a bonding pad (e.g., wirebond pad) and "X" is the minimum spacing between pads (e.g., a minimum pad-to-pad spacing). Both "W" and "X" are defined by the technology specification, e.g., in the shape size and spacing design rules for a given technology (e.g., 32 nm SOI, etc.).

In one exemplary implementation, a high performance design specification has a minimum pad width "W" of 44 um and a minimum spacing "X" of 8 um. In this implementation, the hybrid IO cell 10 has a length and width of 96 um. In another exemplary implementation, a design specification has a minimum pad width "W" of 29 um and a minimum spacing "X" of 6 um. In this implementation, the hybrid IO cell 10 has a length and width of 64 um. The invention is not limited to these exemplary implementations, and any suitable minimum pad width and minimum spacing may be used within the scope of the invention.

Figure 2:
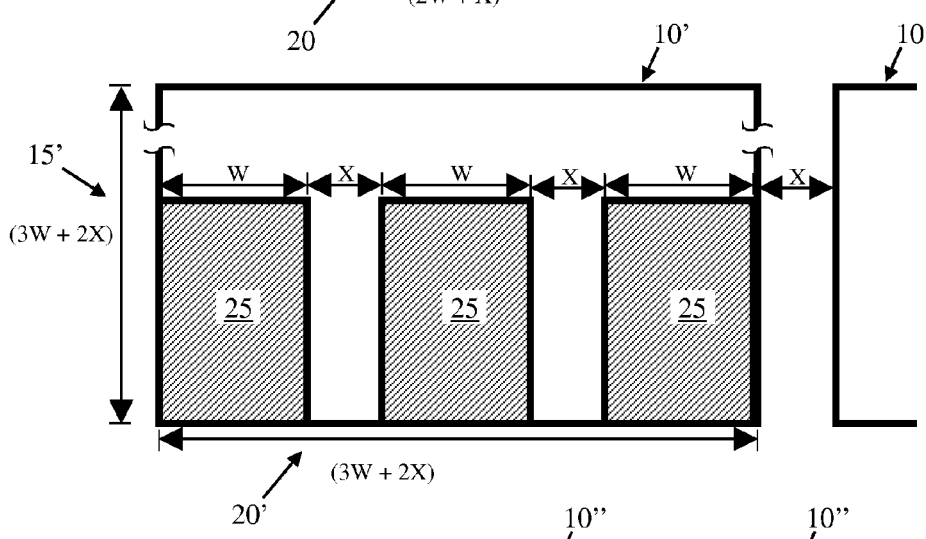
Figure 3:
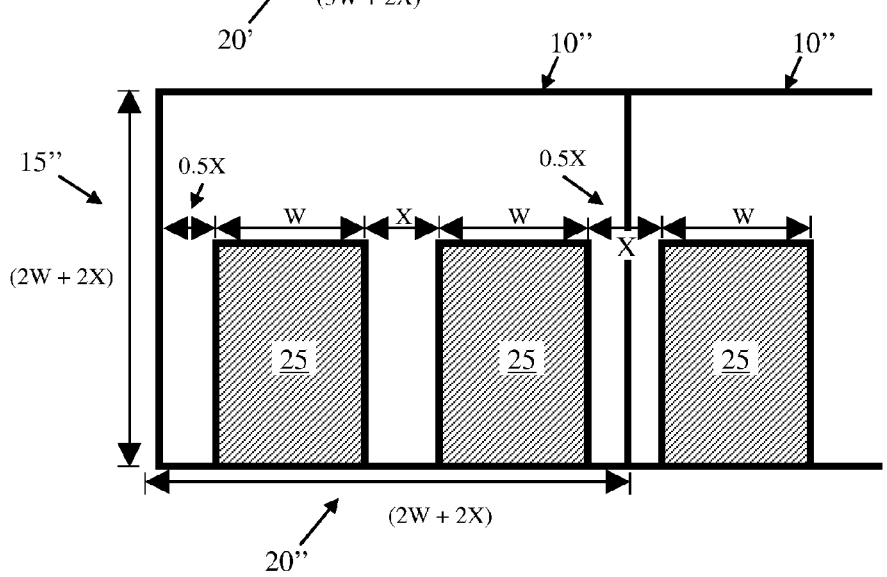

Shaded areas 25 in FIGS. 1-3 depict the shape of wirebond pads in relation to the hybrid IO cells (e.g., hybrid IO cells 10 in FIG. 1). However, in embodiments, the opening where the actual wirebond pad is located is not necessarily within the hybrid IO cell 10 and is thus not part of the design of the hybrid IO cell 10. Instead, the wirebond pad opening is in the chip (e.g., placed in the chip design by a designer) and connected to the hybrid IO cell 10 based on chip design parameters such as, but not limited to, the IO count for the particular application. Also, the designer creates the power grid to connect all of the IO cells together.

Still referring to FIG. 1, a spacing dimension 30 between adjacent hybrid IO cells 10 may be defined as "X", i.e., the same minimum spacing between pads for the given technology used in Equation 1. Providing spacing between adjacent hybrid IO cells is optional and can be used with implementations of the invention, for example, to provide wiring channels between adjacent hybrid IO cells for signal carrying wires.

Implementations of the invention involve determining whether the hybrid IO cell 10 having dimensions of 2W+X (e.g., as shown in FIG. 1) provides sufficient area for containing the IO circuitry that is included in the cell (e.g., electrostatic discharge (ESD) protection circuitry, voltage pull down/up circuitry, etc.) This determination may be performed by attempting to place all of the IO circuitry in the hybrid IO cell 10, e.g., either manually or with a computer-based design tool, after determining the length and width of the hybrid IO cell 10. When the desired IO circuitry fits within the hybrid IO cell 10, then the design of the hybrid IO cell 10 may be created and stored in a library. On the other hand, when the desired IO circuitry does not fit within the hybrid IO cell 10, then a larger hybrid IO cell is created as shown in FIG. 2.

FIG. 2 shows a larger hybrid IO cell 10' having more area than hybrid IO cell 10 of FIG. 1. In accordance with aspects of the invention, the larger hybrid IO cell 10' has a length 15' and width 20' that are both equal to 3W+2X, where "W" and "X" are the same values from Equation 1. The larger hybrid IO cell 10' provides more area for placing the desired IO circuitry in the cell.

In embodiments, both the smaller hybrid IO cell 10 and the larger hybrid IO cell 10' are sized based on a multiple of a design rule minimum pad width (e.g., "W"), and a multiple of a design rule minimum spacing (e.g., "X") for the technology. In this manner, the length and width for any size hybrid IO cell used with spacing between adjacent cells can be expressed by Equation 2:

$$\text{Length}=\text{Width}=(n+1)*W+n*X \qquad (2)$$

In Equation 2, the multiple "n" is based on the desired area of the hybrid IO cell. For example, in the smaller hybrid IO cell 10 shown in FIG. 1, the multiple "n" has a value of 1. For the larger hybrid IO cell 10' shown in FIG. 2 "n" has a value of 2. The multiple "n" may have any predetermined value greater than zero in order to accommodate the desired IO circuitry in the hybrid IO cell. As such, the multiple "n" is an IO circuitry area multiple. In this manner, and in accordance with aspects of the invention, the dimensions of the hybrid IO cell are determined based on a combination of: (i) the design rule minimum pad width; (ii) the design rule minimum spacing between pads; and (iii) an IO circuitry area multiple.

FIG. 3 depicts two abutting hybrid IO cells 10" in accordance with aspects of the invention. As opposed to FIG. 1, FIG. 3 shows that in some embodiments there is no spacing provided between adjacent hybrid IO cells, i.e., edges of two adjacent cells are placed in an abutting (e.g., contacting) relationship. In order to provide sufficient spacing for wirebond pads that may potentially be placed within the footprint of the hybrid 10 cells 10", the length 15" and width 20" of each hybrid IO cell 10" is determined according to Equation 3:

$$\text{Length}=\text{Width}=2W+2X \qquad (3)$$

The area of the hybrid IO cells 10" may be increased by incrementing the value of the "W" and "X" multipliers, e.g., in a manner similar to that described with respect to FIG. 2. For example, when it is determined that more area is needed to contain the desired IO circuitry, then a larger hybrid IO cell may be defined having a length and width equal to 3W+3X.

In even further embodiments, the spacing between adjacent hybrid IO cells may be defined by an IO spacing multiplier "s". In such cases, the length 15" and width 20" of each hybrid IO cell 10" is determined according to Equation 4:

$$\text{Length}=\text{Width}=(n+1)*W+(s+1)*X \qquad (4)$$

The parameters "W", "X" and "n" in Equation 4 are the same parameters as described in Equation 2. The parameter "s" in Equation 4 is an IO spacing multiplier having any desired value between zero (which corresponds to a maximum spacing between adjacent cells) and one (which corresponds to no spacing between cells). In this manner, the spacing between hybrid IO cells may be a fraction of the value of "X", and the length and width of the hybrid IO cells may be defined based on this fractional spacing between adjacent cells.

FIGS. 4-7 show exemplary placements of hybrid IO cells in a die (e.g., chip) in accordance with aspects of the invention. The hybrid IO cells shown in FIG. 4-7 are generally referred to with reference number 10, but it is understood that the hybrid 10 cells shown in FIG. 4-7 may embody any of the characteristics of any of the hybrid 10 cells 10, 10', and 10" from FIGS. 1-3.

Figure 4:
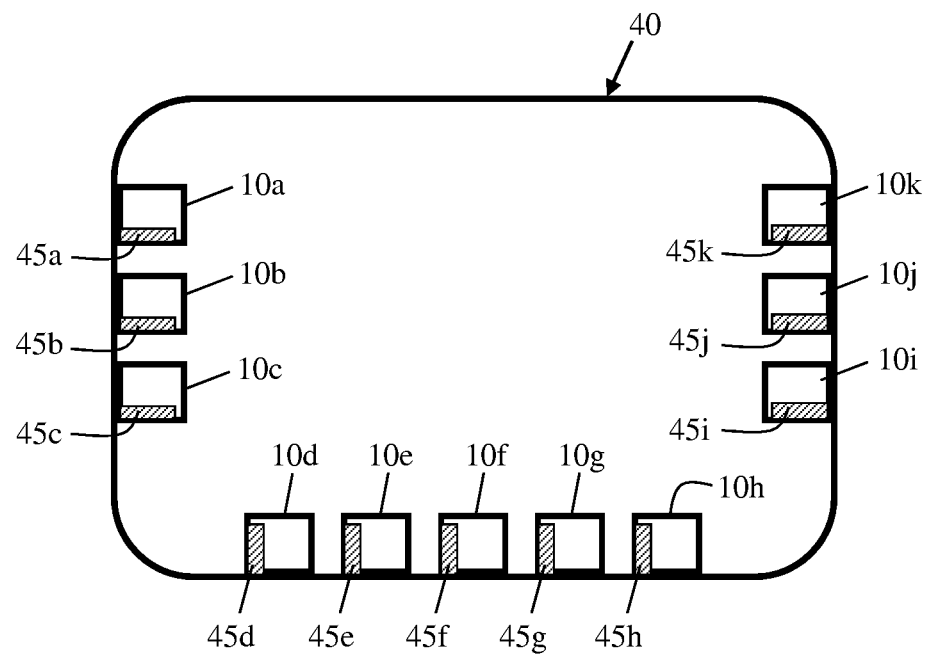
FIGS. 4-7 show exemplary placements of hybrid IO cells in a die (e.g., chip) in accordance with aspects of the invention.

FIG. 4 depicts a chip 40 with hybrid IO cells 10a-k and wirebond pads 45a-k. The chip 40 represents a core-limited wirebond design in which the area of the core is maximized and the cumulative area of all the IO cells is minimized, e.g., by using one row of hybrid IO cells 10a-k and one row of wirebond pads 45a-k at edges of the chip. Each one of the hybrid IO cells 10a-k is associated with and electrically connected to one of the wirebond pads 45a-k. Although the hybrid IO cells 10a-k are shown as overlapping the wirebond pads 45a-k, this configuration is not necessary within the scope of the invention. Since the hybrid IO cell does not include the pad opening, a respective pad (e.g., pad 45a) may be placed in any location on the chip relative to its associated hybrid IO cell (e.g., cell 10a), including a non-overlapping and spaced apart orientation.

Figure 5:
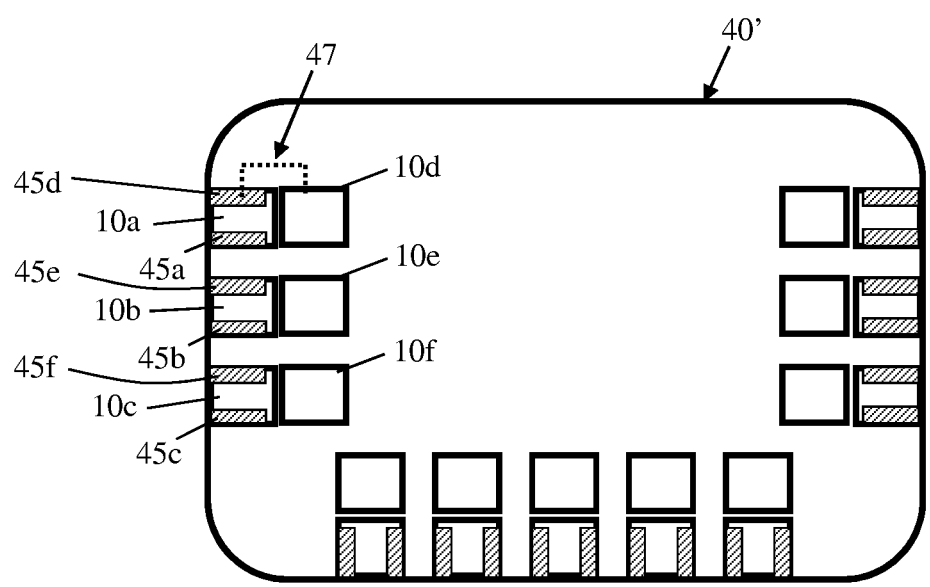

FIG. 5 depicts a chip 40' with an inline wirebond design having two rows of hybrid IO cells 10a-f and a single row of wirebond pads 45a-f at edges of the chip. For clarity, the hybrid IO cells and pads are only labeled along one edge of the chip 40' in FIG. 5, although it is to be understood that similar arrangements of hybrid IO cells and pads may be arranged along other edges of the chip 40'. In embodiments, the pads 45a-f are spaced from one another using the minimum pad pitch (e.g., spacing defined by design rules) permitted by the technology in which the chip 40' is designed. The IO count of chip 40' is thus doubled compared to that of chip 40 (from FIG. 4), while only having a slightly smaller core area. Each respective one of the pads (e.g., 45d) may be electrically connected to a respective one of the hybrid IO cells (e.g., 10d) by wiring 47 provided in a layer of the chip. As shown in FIG. 5, a particular pad (e.g., 45d) and its associated hybrid IO cell (e.g., 10d) need not overlap since, as described herein, the hybrid IO cell does not include the pad opening.

Figure 6:
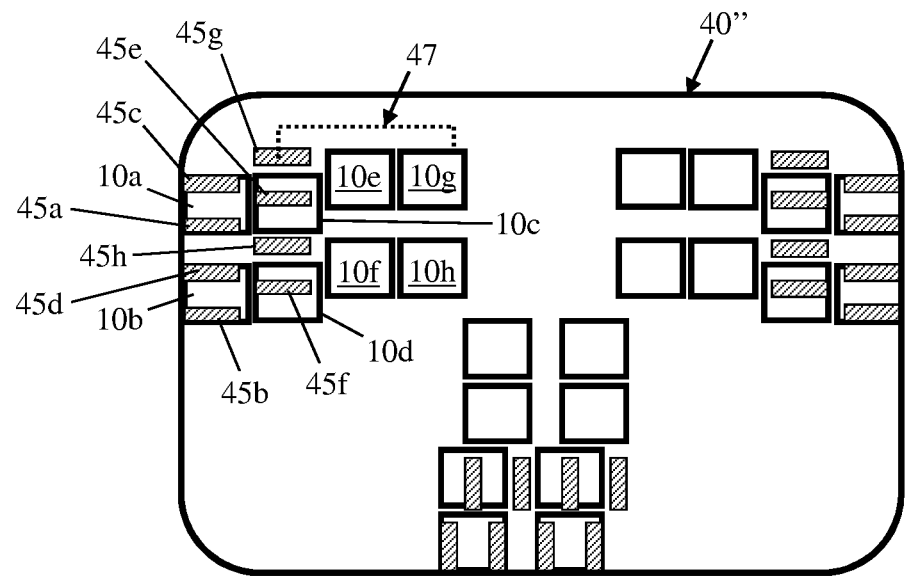

FIG. 6 depicts a chip 40" with an IO limited wirebond design having four rows of hybrid IO cells 10a-h and two rows of wirebond pads 45a-h at edges of the chip. For clarity, the hybrid IO cells and pads are only labeled along one edge of the chip 40" in FIG. 6, although it is to be understood that similar arrangements of hybrid IO cells and pads may be arranged along other edges of the chip 40". Thus, although not all of the IO cells and pads are shown in FIG. 6, it is to be understood that the IO limited design depicted in FIG. 6 may be used to double the number of IO cells compared to that of chip 40' (from FIG. 5). The IO limited (also called staggered) design depicted in FIG. 6 provided less core area than the chip 40' in FIG. 5. Each respective one of the pads (e.g., 45g) may be electrically connected to a respective one of the hybrid IO cells (e.g., 10g) by wiring 47 provided in a layer of the chip. As shown in FIG. 6, a particular pad (e.g., 45g) and its associated hybrid IO cell (e.g., 10g) need not overlap since, as described herein, the hybrid IO cell does not include the pad opening.

Figure 7:
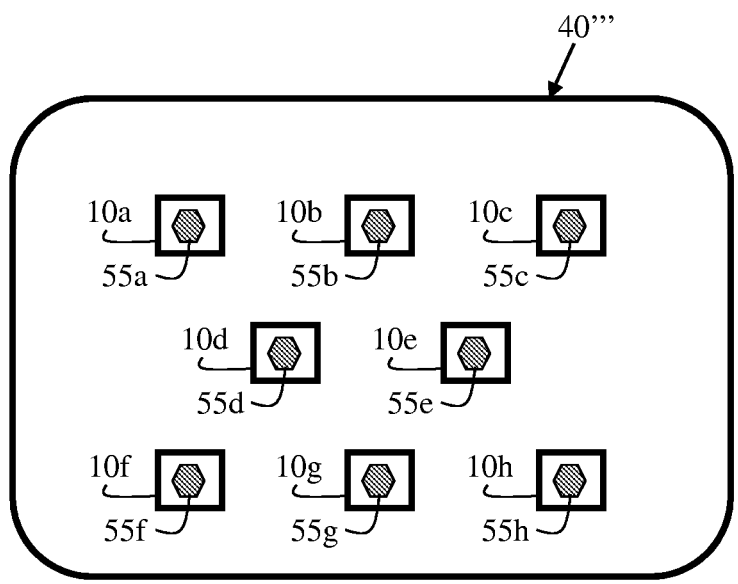

FIG. 7 depicts a C4 chip 40' having hybrid IO cells 10a-h and C4 connections 55a-h. Each one of the hybrid IO cells 10a-h is associated with and electrically connected to one of the C4 connections 55a-h. In C4 designs, the hybrid IO cells 10a-h may be placed in any area of the chip in any configuration.

It is noted that the invention is not limited to the exemplary embodiments depicted in FIGS. 4-7. Hybrid IO cells in accordance with aspects of the invention can be used with any chip configuration in the design and manufacture of an IC package.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
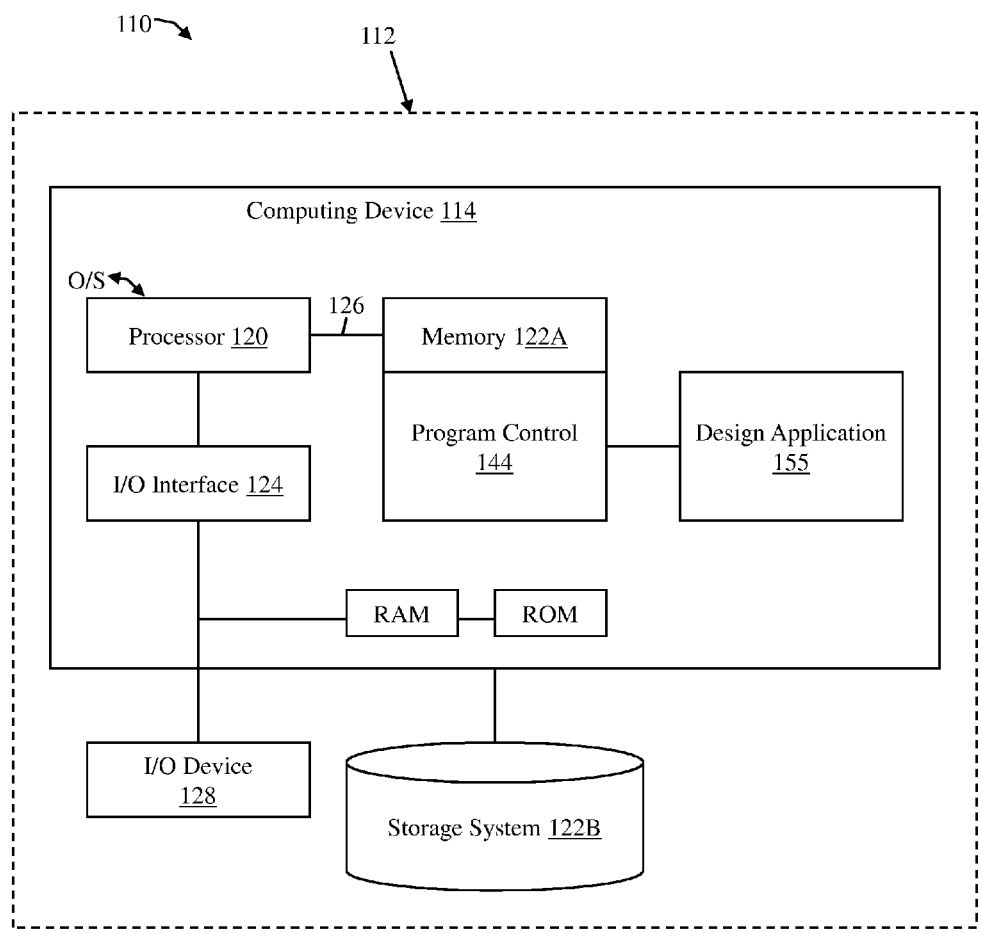
FIG. 8 shows an illustrative environment of a computing infrastructure for implementing steps in accordance with aspects of the invention.

FIG. 8 shows an illustrative environment 110 for managing the processes in accordance with the invention. To this extent, the environment 110 includes a server or other computing infrastructure 112 that can perform the processes described herein. In particular, the computing infrastructure 112 includes a computing device 114. The computing device 114 can be resident on a network infrastructure or computing device of a third party service provider (any of which is generally represented in FIG. 8).

The computing device 114 includes a processor 120, memory 122A, an I/O interface 124, and a bus 126. The memory 122A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 114 is in communication with the external I/O device/resource 128 and the storage system 122B. For example, the I/O device 128 can comprise any device that enables an individual to interact with the computing device 114 (e.g., user interface) or any device that enables the computing device 114 to communicate with one or more other computing devices using any type of communications link. The external I/O device/resource 128 may be, for example, a handheld device, PDA, handset, keyboard, etc.

In general, the processor 120 executes computer program code (e.g., program control 144), which can be stored in the memory 122A and/or storage system 122B. Moreover, in accordance with aspects of the invention, the program control 144 controls a design application 155 that performs one or more of the processes described herein. In embodiments, the design application 155 operates to: determine a minimum pad size for a designated technology; determine a minimum pad-to-pad spacing for the technology; and determine dimensions of a hybrid IO cell based on at least the minimum pad size and pad-to-pad spacing.

In accordance with aspects of the invention, the design application 155 may be used in creating a definition of a hybrid IO cell that can be used in the design and fabrication of integrated circuits. The definition of the hybrid IO cell may be stored in a library and subsequently used by a designer, e.g., placed in a design of an integrated circuit. A circuit including the hybrid IO cell may then be fabricated (e.g., physically manufactured) using the design of the integrated circuit.

Still referring to FIG. 8, the design application 155 can be implemented as one or more program code in the program control 144 stored in memory 122A as separate or combined modules. Additionally, the design application 155 may be implemented as separate dedicated processors or a single or several processors to provide the function of this tool. Moreover, it should be understood by those of ordinary skill in the art that the design application 155 is used as a general descriptive term for providing the features and/or functions of the present invention, and that the design application 155 may comprise many different components. For example, the design application 155 may be part of an integrated circuit software design tool that is used in creating integrated circuits, e.g., ASIC, Foundry, etc.

While executing the computer program code, the processor 120 can read and/or write data to/from memory 122A, storage system 122B, and/or I/O interface 124. The program code executes the processes of the invention. The bus 126 provides a communications link between each of the components in the computing device 114.

The computing device 114 can comprise any general purpose computing article of manufacture capable of executing computer program code installed thereon (e.g., a personal computer, server, etc.). However, it is understood that the computing device 114 is only representative of various possible equivalent-computing devices that may perform the processes described herein. To this extent, in embodiments, the functionality provided by the computing device 114 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 112 is only illustrative of various types of computer infrastructures for implementing the invention. For example, in embodiments, the computing infrastructure 112 comprises two or more computing devices (e.g., a server cluster) that communicate over any type of communications link, such as a network, a shared memory, or the like, to perform the process described herein. Further, while performing the processes described herein, one or more computing devices on the computing infrastructure 112 can communicate with one or more other computing devices external to the computing infrastructure 112 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 9:
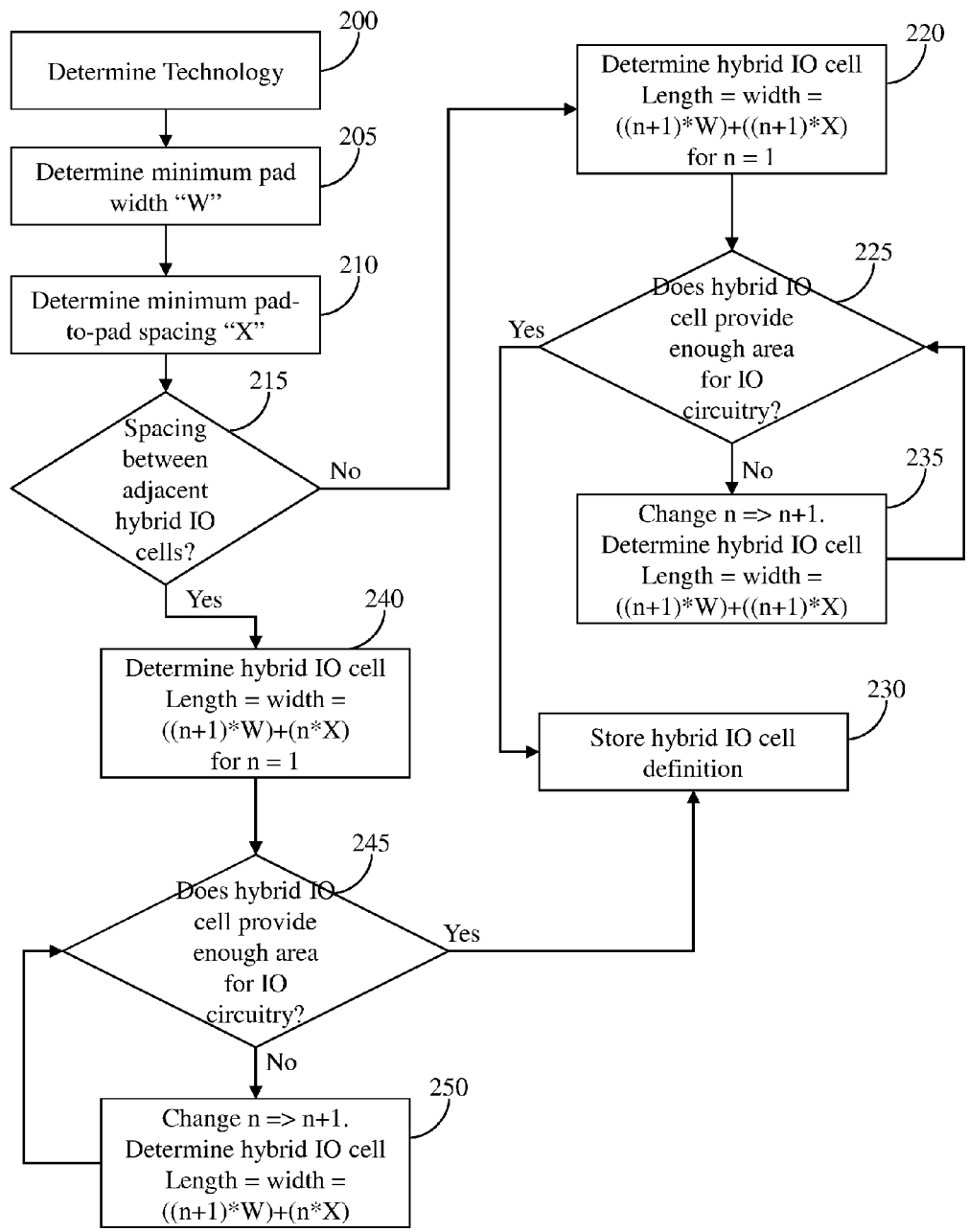
FIG. 9 is a flow diagram for implementing steps in accordance with aspects of the invention.

FIG. 9 shows an exemplary flow for performing exemplary processes in accordance with aspects of the invention. The steps of FIG. 9 may be implemented in the environment of FIG. 8, for example.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 8. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 9 depicts a process of designing a hybrid IO cell in accordance with aspects of the invention. At step 200, the technology for the chip design is determined. In embodiments, a design application (e.g., design application 155 running on a computing device 114) automatically determines the technology (e.g., node) based on the design specification for the chip in which the hybrid IO cell will be used. Alternatively, a user (e.g., a designer) may manually provide information to the design tool (e.g., using I/O interface 124) designating the technology.

At step 205, the design application determines the minimum pad width (e.g., parameter "W") for the technology of step 200. In embodiments, the design application automatically determines the minimum pad width from the design rules for the designated technology, e.g., by accessing stored data that defines the design rules for the technology. Alternatively, a user (e.g., a designer) may manually provide information to the design tool (e.g., using I/O interface 124) designating the minimum pad width.

At step 210, the design application determines the minimum pad-to-pad spacing (e.g., parameter "X") for the technology of step 200. In embodiments, the design application automatically determines the minimum pad-to-pad spacing from the design rules for the designated technology, e.g., by accessing stored data that defines the design rules for the technology. Alternatively, a user (e.g., a designer) may manually provide information to the design tool (e.g., using I/O interface 124) designating the minimum pad-to-pad spacing.

Step 215 includes determining whether spacing is desired between adjacent hybrid IO cells. In embodiments, the design application prompts a user to enter information to (e.g., using I/O interface 124) designating whether spacing is desired between adjacent hybrid IO cells. Such spacing may be desired for placing wires between adjacent hybrid IO cells, e.g., as described with respect to FIG. 1.

When no spacing is indicated at step 215, then at step 220 the design application determines the length and width of the hybrid IO cell using the expression $((n+1)*W)+((n+1)*X)$, where n=1. A hybrid IO cell of these dimensions is particularly useful in configurations in which adjacent cells abut one another, e.g., as shown in FIG. 3.

At step 225, the design application determines whether the hybrid IO cell having the length and width determined at step 220 has sufficient area for containing the desired IO circuitry (e.g., by comparing an area of the hybrid IO cell to IO circuitry associated with the IO cell). In embodiments, the design application automatically attempts to place the desired IO circuitry in an IO cell having the dimensions determined at step 220, e.g., using a shapes placement tool. Alternatively, the design application may prompt a user to manually attempt to place the desired IO circuitry in an IO cell having the dimensions determined at step 220. The desired IO circuitry used at step 225 may be determined from the design specification for the chip in which the hybrid IO cell will be used.

When it is determined at step 225 that there is sufficient area (i.e., the desired IO circuitry can be placed in the area provided by the hybrid IO cell having the length and width determined at step 220), then at step 230 the design of the hybrid IO cell is stored. In embodiments, the design application stores data defining the length and width of the hybrid IO cell in a library for this technology (e.g. the technology from step 200). For example, step 230 may comprise storing a definition of the hybrid IO cell including the determined width and length in a library stored on a computer useable storage medium (e.g., storage 122B). In this manner, any chip configuration in this technology may include the hybrid IO cell at any location on the chip and without need for rotating the orientation of the hybrid IO cells when being placed in the chip.

Following storage of the hybrid IO cell definition in a library at step 230, a method may further include placing the hybrid IO cell at an edge of a chip design, fabricating a chip using the chip design, and integrating the fabricated chip in a package. As such, implementations of the invention may include an integrated circuit chip comprising a hybrid IO cell having a width that is based on a minimum pad width and a minimum pad spacing for a technology, wherein a length of the hybrid IO cell is equal to the width.

When it is determined at step 225 that there is insufficient area (i.e., the desired IO circuitry cannot be placed in the area provided by the hybrid IO cell having the length and width determined at step 220), then at step 235 the length and width of the hybrid IO cell are increased. In embodiments, the IO circuitry area multiple "n" is incremented by a value of one, e.g., n=>n+1, and the length and width are re-calculated using the expression $((n+1)*W)+((n+1)*X)$ with the new value of "n". The process then returns to step 225 for determining whether the new length and width of the hybrid IO cell provide sufficient area from the desired IO circuitry.

Referring back to step 215, when spacing is indicated at step 215, then at step 240 the design application determines the length and width of the hybrid IO cell using the expression $((n+1)*W)+(n*X)$, where n=1. A hybrid IO cell of these dimensions is particularly useful in configurations in which adjacent cells have a predetermined spacing between one another, e.g., as shown in FIG. 1.

At step 245, the design application determines whether the hybrid IO cell having the length and width determined at step 240 has sufficient area for containing the desired IO circuitry. In embodiments, step 245 is performed in the same manner as described with respect to step 225.

When it is determined at step 245 that there is sufficient area (i.e., the desired IO circuitry can be placed in the area provided by the hybrid IO cell having the length and width determined at step 220), then the process proceeds to step 230 as already described herein.

When it is determined at step 245 that there is insufficient area (i.e., the desired IO circuitry cannot be placed in the area provided by the hybrid IO cell having the length and width determined at step 240), then at step 250 the length and width of the hybrid 10 cell are increased. In embodiments, the IO circuitry area multiple "n" is incremented by a value of one, e.g., n=>n+1, and the length and width are re-calculated using the expression $((n+1)*W)+(n*X)$ with the new value of "n". The process then returns to step 245 for determining whether the new length and width of the hybrid IO cell provide sufficient area from the desired IO circuitry.

Figure 10:
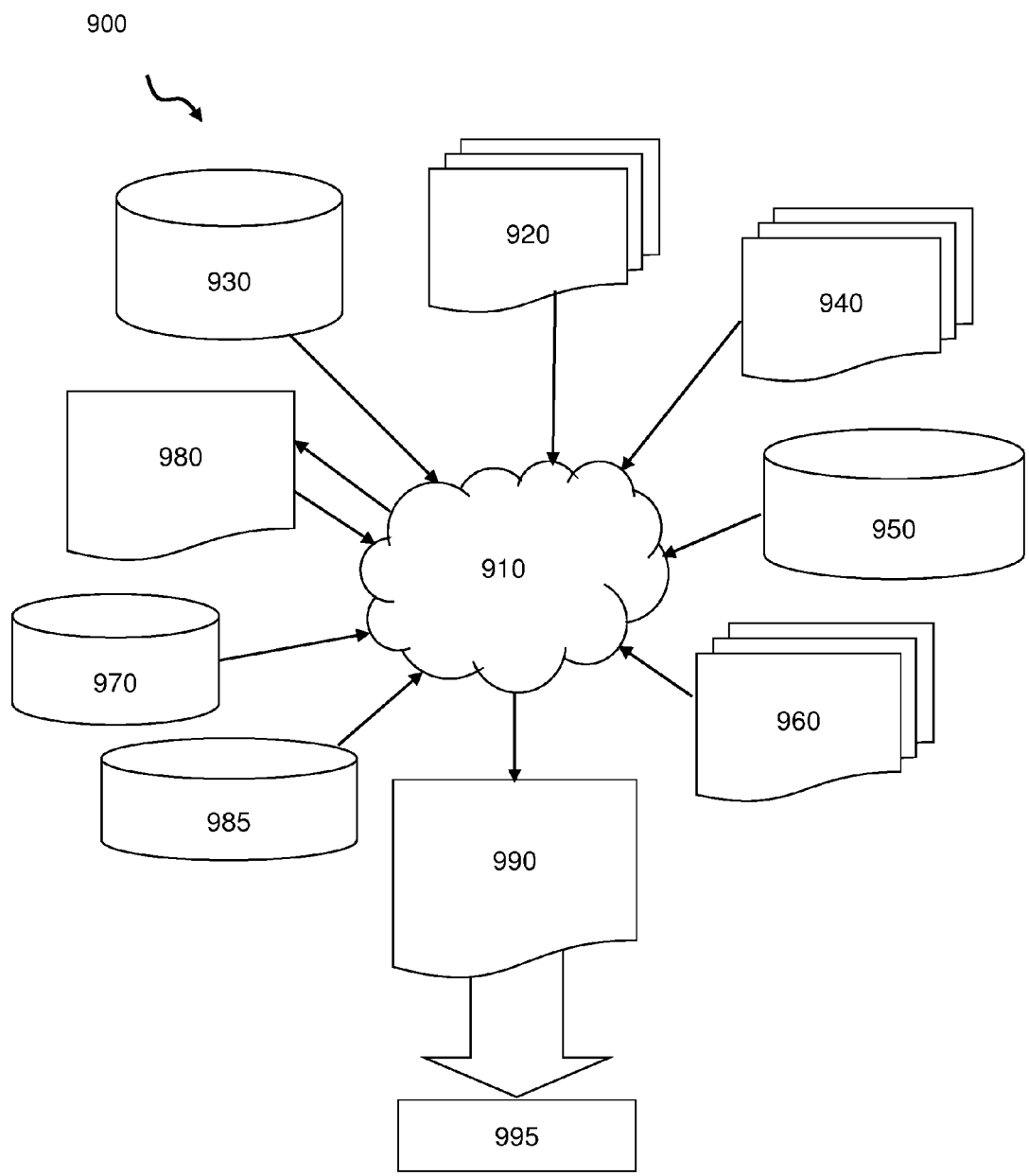
FIG. 10 is a flow diagram of a design process used in semiconductor design, manufacture, and/or test.

FIG. 10 is a flow diagram of a design process used in semiconductor design, manufacture, and/or test. FIG. 10 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1-7. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-7. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-7 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-7. In one embodiment, design structure 990 may comprise a compiled, executable HDL simulation model that functionally simulates the devices shown in FIGS. 1-7.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-7. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method of designing a hybrid IO (input-output) cell, comprising:
    determining a width of the hybrid IO cell based on a minimum pad width and a minimum pad spacing for a technology;
    determining a length of the hybrid IO cell based on the determined width;
    storing a definition of the hybrid IO cell including the determined width and length in a library stored on a computer useable storage medium; and
    determining whether spacing is present between adjacent ones of the hybrid IO cell, wherein:
    when spacing is present between adjacent ones of the hybrid IO cell, the width and the length are determined according to Length=Width=$(n+1)*W+n*X$, where "W" is the minimum pad width, "X" is the minimum pad spacing, and "n" is an IO circuitry area multiple; and
    when spacing is not present between adjacent ones of the hybrid IO cell, the width and the length are determined according to Length=Width=$(n+1)*W+(n+1)*X$.

2. The method of claim 1, wherein the determining the length comprises setting the length equal to the determined width.

3. The method of claim 2, further comprising placing the hybrid IO cell at an edge of a chip design.

4. The method of claim 3, further comprising fabricating a chip using the chip design.

5. The method of claim 4, further comprising integrating the fabricated chip in a package.

6. The method of claim 1, wherein the library is configured for use with controlled collapse chip connection, wirebond core limited, wirebond IO limited, and wirebond inline chip designs.

7. The method of claim 1, wherein the determining the width of the hybrid IO cell, the determining the length of the hybrid IO cell, and the storing are performed using a design application running on a computing device.

8. The method of claim 1, wherein the hybrid IO cell is devoid of an opening for a pad.

9. A method of designing a hybrid IO cell for use with controlled collapse chip connection, wirebond core limited, wirebond IO limited, and wirebond inline chip designs, the method comprising:
    designating a technology;
    determining, using a computing device, a minimum pad width of the technology, wherein the minimum pad width is a minimum width of a bonding pad defined by a technology specification for the technology;
    determining, using the computing device, a minimum pad spacing of the technology;
    determining, using the computing device, a width of the hybrid IO cell based on the minimum pad width and the minimum pad spacing;
    setting, using the computing device, a length of the hybrid JO cell equal to the determined width;
    storing, using the computing device, a definition of the IO cell in a library; and determining whether spacing is present between adjacent ones of the hybrid IO cell, wherein:

when spacing is present between adjacent ones of the hybrid IO cell, the width and the length are determined according to Length=Width=(n+1)*W+n*X, where "W" is the minimum pad width, "X" is the minimum pad spacing, and "n" is an IO circuitry area multiple; and when spacing is not present between adjacent ones of the hybrid IO cell, the width and the length are determined according to Length=Width=(n+1)*W+(n+1)*X.

10. The method of claim 9, further comprising:

comparing an area of the hybrid IO cell to IO circuitry associated with the hybrid IO cell; and incrementing a value of "n" when the area of the hybrid JO cell is insufficient to contain the IO circuitry.

11. The method of claim 9, wherein the determining the width of the hybrid IO cell, the setting the length of the hybrid IO cell, and the storing are performed using a design application running on the computing device.

12. The method of claim 9, further comprising fabricating a chip using comprising the hybrid IO cell.

13. An integrated circuit chip, comprising a hybrid IO cell having a width that is based on a minimum pad width and a minimum pad spacing for a technology, wherein a length of the hybrid IO cell is equal to the width, wherein:

when spacing is present between adjacent ones of the hybrid IO cell, the width and the length are determined according to Length=Width=(n+1)*W+n*X, where "W" is the minimum pad width, "X" is the minimum pad spacing, and "n" is an IO circuitry area multiple; and when spacing is not present between adjacent ones of the hybrid IO cell, the width and the length are determined according to Length=Width=(n+1)*W+(n+1)*X.

14. The integrated circuit chip of claim 13, wherein a pad associated with and connected to the hybrid IO cell is located in a layer of the chip outside the hybrid IO cell, and the minimum pad width is a minimum width of a bonding pad defined by a technology specification for the technology.

* * * * *